US012804602B2

(12) United States Patent
Uniyal

(10) Patent No.: US 12,804,602 B2
(45) Date of Patent: Nov. 17, 2026

(54) SYSTEM AND METHOD FOR ENHANCING USER EXPERIENCE WITH MULTI-SIM DEVICE THROUGH PAGING ENHANCEMENT IN A STANDALONE OPEN-RAN CELLULAR COMMUNICATIONS NETWORK

(71) Applicant: BOOST SUBSCRIBERCO L.L.C., Englewood, CO (US)

(72) Inventor: Manish Uniyal, Parker, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 293 days.

(21) Appl. No.: 18/614,119

(22) Filed: Mar. 22, 2024

(65) Prior Publication Data

US 2025/0301450 A1 Sep. 25, 2025

(51) Int. Cl.

*H04W 68/02* (2009.01)
*H04W 8/18* (2009.01)
*H04W 48/18* (2009.01)

(52) U.S. Cl.

CPC ............. *H04W 68/02* (2013.01); *H04W 8/18* (2013.01); *H04W 48/18* (2013.01)

(58) Field of Classification Search

CPC ....... H04W 68/02; H04W 8/18; H04W 8/183; H04W 48/18; H04W 60/005

See application file for complete search history.

(56) References Cited

U.S. PATENT DOCUMENTS

| | | | | |
|---|---|---|---|---|
| 11,595,940 | B1 * | 2/2023 | Vadapalli | H04W 68/02 |
| 2018/0199303 | A1 * | 7/2018 | Vayilapelli | H04W 8/265 |
| 2022/0030050 | A1 | 1/2022 | Ergen et al. | |

(Continued)

FOREIGN PATENT DOCUMENTS

WO WO-2022009177 A1 * 1/2022 ........... H04W 88/06

OTHER PUBLICATIONS

3rd Generation Partnership Project; Technical Specification Group Services and System Aspects; Study on system enablers for devices having multiple Universal Subscriber Identity Modules (USIM) (Release 17), Technical Report, 3GPP TR 23 761 V1.1.0 (Oct. 2020), 108 pages.

(Continued)

*Primary Examiner* — Siu M Lee

(74) *Attorney, Agent, or Firm* — Kipman T. Werking; Frontier IP Law PLLC

(57) ABSTRACT

A system and method for performing paging enhancement for a mobile device having multiple universal subscriber identity modules (USIMs) and single transmit and receive antennas and operating in a cellular telecommunications network. The solution includes detecting a paging collision based on the paging occasion for each of the USIMs and, in response, requesting a new unique temporary user equipment (UE) identity for one of the USIMs according to a network selection rule. The network selection rules can identify a primary USIM for which to request the new UE identity and/or can prioritize requesting the new UE identity from a preferred network. The new UE identity defines a new paging occasion for the USIM thereby mitigating paging collisions. Furthermore, the solution can include verifying the new temporary UE identity does not cause a new paging collision.

17 Claims, 4 Drawing Sheets

(56) References Cited

U.S. PATENT DOCUMENTS

| | | | | |
|---|---|---|---|---|
| 2022/0240213 | A1* | 7/2022 | Ly | H04W 4/14 |
| 2022/0322269 | A1* | 10/2022 | Chen | H04W 60/005 |
| 2023/0093965 | A1 | 3/2023 | Velev et al. | |
| 2023/0096752 | A1* | 3/2023 | Gupta | H04W 60/04<br>370/329 |
| 2023/0308946 | A1 | 9/2023 | Zhou et al. | |
| 2023/0328535 | A1 | 10/2023 | Trujillo | |
| 2023/0337046 | A1 | 10/2023 | Mehta et al. | |
| 2023/0337047 | A1 | 10/2023 | Mehta et al. | |
| 2023/0396979 | A1 | 12/2023 | Kanchiraju et al. | |
| 2024/0022948 | A1* | 1/2024 | Beckwith | H04L 5/0048 |
| 2024/0089918 | A1* | 3/2024 | Shrivastava | H04W 48/18 |

OTHER PUBLICATIONS

Vikhrova, et al., "Multi-SIM support in 5G Evolution: Challenges and Opportunities," IEEE Communications Standards Magazine, arXiv:2201.08041v1 [cs.NI] Jan. 20, 2022, 8 pages.

International Search Report and Written Opinion mailed Jul. 14, 2025 for Application No. PCT/US2025/020100. 24 pages.

Abazi. "5G new radio evolution towards enhanced features." University of Oulu. Master's Thesis. Mar. 2023; 38 pages.

Burke. "5G Standalone (5G SA)." TechTarget. Nov. 23, 2023. Retrieved from: <<https://www.techtarget.com/searchnetworking/definition/5G-standalone-5G-SA>>. Accessed on Aug. 12, 2025. 6 pages.

No Author Listed. "Paging concept in 5G." Tech Junction. Apr. 16, 2023. Retrieved from: <<https://techjunction.co/tech-question/paging-concept-in-5g/>>. Accessed on Aug. 12, 2025. 10 pages.

No Author Listed. Open RAN: The O-Ran Alliance, O-Ran architecture, 5G, and Testing solutions. Viavi Solutions. 2022. Retrieved from: <<https://web.archive.org/web/20231223110638/-https://www.viavisolutions.com/en-us/solutions/open-ran>>. Accessed on Aug. 12, 2025. 14 pages.

No Author Listed. "Support for multi-SIM devices for LTE/NR." 3GPP. Aug. 8, 2022. Retrieved from: <<https://www.3gpp.org/technologies/support-for-multi-sim-devices-for-lte-nr>>. Accessed on Aug. 12, 2025. 4 pages.

No Author Listed. "Paging frame and paging occasion." TechlteWorld. Dec. 2, 2023. Retrieved from: <<https://techlteworld.com/paging-frame-and-paging-occasion/>>. Accessed on Aug. 12, 2025. 7 pages.

Peterson et al. "Chapter 2: Architecture." Private 5G A Systems Approach. 2023. Retrieved from: <<https://5g.systemsapproach.org/arch.html>>. Accessed on Aug. 12, 2025. 16 pages.

Polese et al. Understanding O-RAN: Architecture, Interfaces, Algorithms, Security, and Research Challenges. arXiv. Aug. 1, 2022; 2202.01032v2. 33 pages.

Tomás. "What is Multi-SIM?" RCR Wireless. Mar. 31, 2022. Retrieved from: <<https://www.rcrwireless.com/20220331/5g/what-is-multi-sim>>. Accessed on Aug. 12, 2025. 2 pages.

* cited by examiner

SYSTEM AND METHOD FOR ENHANCING USER EXPERIENCE WITH MULTI-SIM DEVICE THROUGH PAGING ENHANCEMENT IN A STANDALONE OPEN-RAN CELLULAR COMMUNICATIONS NETWORK

FIELD OF THE DISCLOSURE

The present disclosure generally relates to communications, and more specifically, to providing multi-subscription wireless communication services on user equipment having more than one subscriber identity module.

BACKGROUND OF THE DISCLOSURE

A cellular telecommunications network, such as a fifth generation (5G) network, connects user equipment (UE) to a data network (DN), and includes two domains, the radio access network (RAN) and the core network (CN). The RAN includes the cellular telecommunications antenna and base stations for transmitting and receiving radio frequency signals to and from UEs, and provides the link between the user equipment and the core network. The CN connects UEs to the DN, performs access control, routes telephone calls over the public-switched telephone network (PSTN) and facilitates handovers as a UE moves between respective coverage areas of RAN base stations, among many other functions.

A universal subscriber identity module (USIM) allows user equipment (UE), such as mobile devices, to be identified and authenticated on a network. The UE is identified by the international mobile subscriber identity (IMSI) number associated with the USIM. The USIM identifies the service provider network that the UE normally connects with. The USIM may also be associated with a phone number for the device. A USIM may be a physical SIM (pSIM) or an embedded SIM (eSIM). A pSIM is a physical card that is inserted into an associated slot in the UE. An eSIM, on the other hand, is a digital version of a pSIM including a profile that can be downloaded to a mobile device to provide the functionalities of a pSIM.

There is a growing demand for user equipment with multiple USIMs managing multiple mobile subscriptions within a single device. The eSIM technology, for example, allows customers to install many eSIM profiles and select between subscriptions. However, with multiple subscriptions, mobile terminated (MT) services, such as voice calls, short message service (SMS), and emergency notifications from different networks risk overlap and can fail to reach the user.

Current UE implementations typically support multi-USIM (MUSIM) configurations by time multiplexing operations between each installed USIMs, for example, by allocating a time slot for each USIM to communicate with respective mobile network operators (MNOs), which can be the same or different MNOs. Many MUSIM UEs share common radio and baseband components with some common software to enable the UE to switch operations between the two USIMs. Such devices are referred to as single-Tx/single-Rx devices. One main issue with having shared receive (Rx) and transmit (Tx) components is the UE is not able to monitor for downlink traffic or to send uplink traffic for both USIMs at the same time. A related issue is the collision of paging occasions.

Paging is a mechanism used by a wireless network to notify idle UEs about incoming data, call requests, network updates and the like. The process involves the network triggering a paging message. For example, a 5G wireless network, through the access and mobility management function, sends a paging message through the radio base station (gNodeB or gNB) containing key information elements that enable the UE to receive the paging message and respond accordingly. Concomitantly, the UE is configured to listen for paging messages at a specific interval referred to as the paging occasion (PO). In response to a paging message, the UE initiates a service request procedure to establish a connection with the network using the appropriate USIM.

A "paging collision" occurs when the paging occasion of multiple subscriptions overlap in time. Given the constraints of single-Tx/single-RX devices, paging occasions of a UE for different USIM profiles can overlap occasionally or systematically. When a paging collision occurs, one subscription is assigned the radio frequency resource to the exclusion of the other subscriptions. Unresolved collisions can cause service disruption or loss and resource waste.

Accordingly, improved mitigation of paging collisions is needed.

SUMMARY OF THE DISCLOSURE

According to an embodiment of the present disclosure, a method for performing paging enhancement is provided. The method includes detecting, with a mobile device having multiple universal subscriber identity modules (USIMs) including a first USIM subscribed with a first cellular communications network and a second USIM subscribed with a second cellular telecommunications network, a paging collision by comparing a first paging occasion (PO) for the first USIM with a second PO for the second USIM. More specifically, the first PO is defined by a temporary user equipment identity assigned to the first USIM and the second PO is defined by a temporary user equipment identity assigned to the second USIM. The method also includes selecting, in response to detecting the paging collision and according to a network preference rule, one of the first USIM and the second USIM for which to request a new temporary user equipment identity. Further, the method includes, requesting a new temporary user equipment identity from one of the first cellular telecommunications networks and the second cellular telecommunications network that the selected one of the first USIM and the second USIM is subscribed with. Additionally, the method includes continuing communications with the corresponding one of the first cellular telecommunications network and the second cellular telecommunications network using a new paging occasion defined by the new temporary user equipment identity for the selected one of the first USIM and the second USIM.

According to a further embodiment of the present disclosure, a non-transitory computer-readable medium storing a computer program is provided. The computer program is configured to cause a processor of a mobile device, which has multiple universal subscriber identity module (USIMs) for communicating with at least one cellular telecommunications network, to: detect a paging collision by comparing a first PO for a first USIM of the mobile device subscribed with a first cellular communications network with a second PO for a second USIM of the mobile device subscribed with a second cellular telecommunications network. More specifically, the first PO is defined by a temporary user equipment identity assigned to the first USIM and the second PO is defined by a temporary user equipment identity assigned to the second USIM. The computer program further configures the processor to select, in response to detecting the paging collision and according to a network preference rule, one of the first USIM and the second USIM for which to request a new temporary user equipment identity. The computer program further configures the processor to request the new temporary user equipment identity from one of the first cellular telecommunications networks and the second cellular telecommunications network that the selected one of the first USIM and the second USIM is subscribed with. Additionally, the computer program further configures the processor to continue communications with the corresponding one of the first cellular telecommunications network and the second cellular telecommunications network using a new paging occasion defined by the new temporary user equipment identity for the selected one of the first USIM and the second USIM.

According to a further embodiment of the present disclosure, a system for paging enhancement is disclosed. The system comprises a mobile device having a first universal subscriber identity module (USIM) subscribed with a first cellular communications network and a second USIM subscribed with a second cellular communications network, a processor, and a non-transitory computer-readable medium storing a computer program. In particular, the computer program configures the processor to detect a paging collision by comparing a first paging occasion (PO) for the first USIM with a second PO for the second USIM. More specifically, the first PO is defined by a temporary user equipment identity assigned to the first USIM and the second PO is defined by a temporary user equipment identity assigned to the second USIM.

The computer program further configures the processor to select, in response to detecting the paging collision and according to a network preference rule, one of the first USIM and the second USIM for which to request a new temporary user equipment identity. The computer program further configures the processor to request the new temporary user equipment identity from one of the first cellular telecommunications networks and the second cellular telecommunications network that the selected one of the first USIM and the second USIM is subscribed with. Additionally, the computer program further configures the processor to continue communications with the corresponding one of the first cellular telecommunications network and the second cellular telecommunications network using a new paging occasion defined by the new temporary user equipment identity for the selected one of the first USIM and the second USIM.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of illustrative embodiments of the disclosure.

DESCRIPTION OF CERTAIN EMBODIMENTS OF THE DISCLOSURE

By way of overview and introduction, the present disclosure provides paging enhancement solutions to address the issue of paging occasion collisions in MUSIM mobile devices in a wireless communications network. In particular, embodiments disclosed herein are directed toward paging enhancement for a single-Rx/single-Tx MUSIM UE in a cloud-native, open radio access network (O-RAN), fifth-generation standalone (5G SA) cellular telecommunication network, or a similar or future such network.

Figure 1:
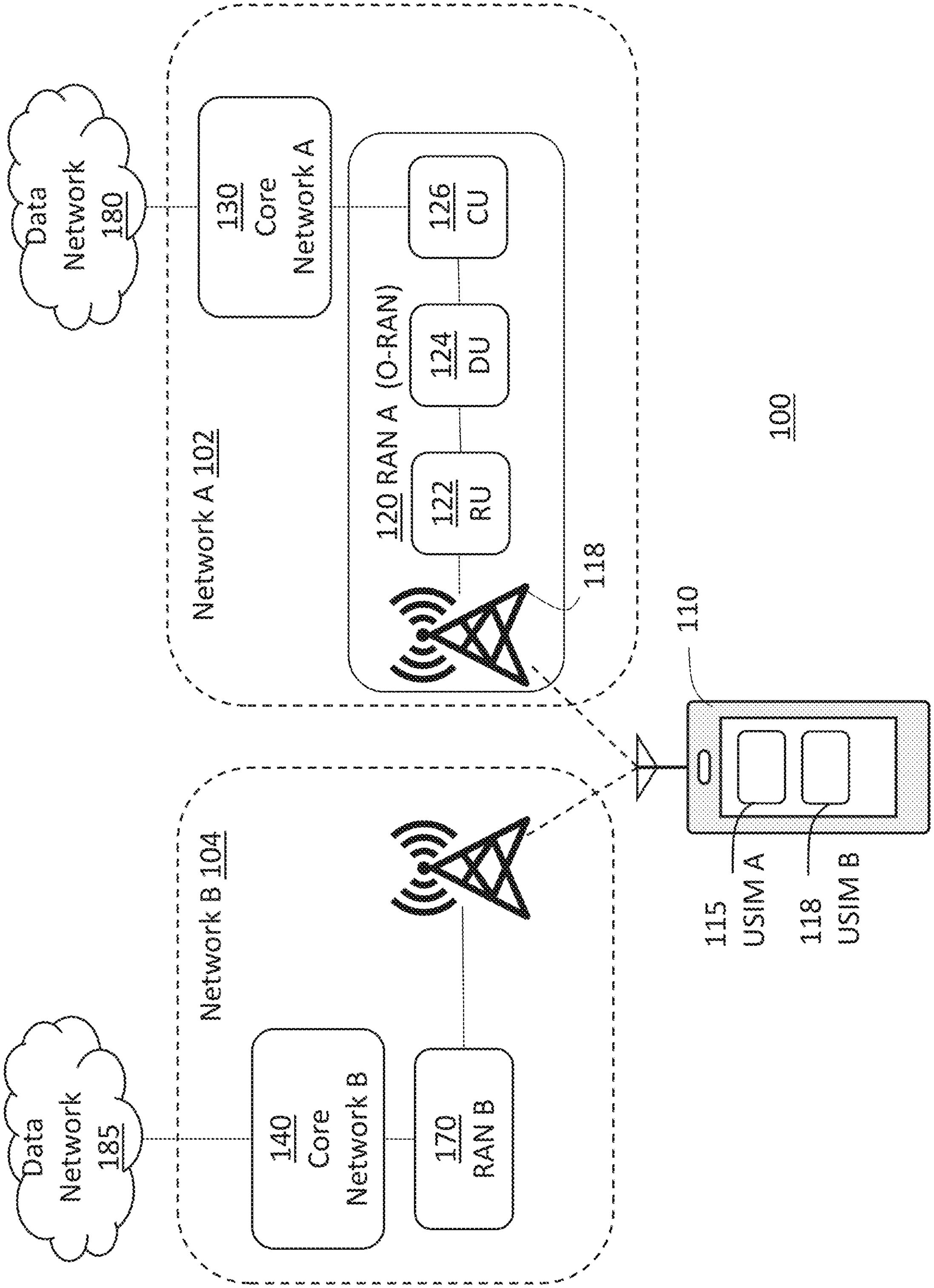
FIG. 1 is a diagram illustrating an exemplary system architecture overview of a system in which a paging enhancement solution can be implemented according to an embodiment.

FIG. 1 illustrates an exemplary cellular network system 100 environment in which a paging enhancement solution for single-Rx/single-Tx MUSIM devices in a 5G SA O-RAN network can be implemented according to an embodiment of the present disclosure. Although embodiments of the paging enhancement solution are described herein as being implemented in a wireless network system that comprises a 5G SA O-RAN network, the embodiments are not so limited and can be implemented in other existing or future wireless communication networks without departing from the scope of the embodiments. Furthermore, although embodiments of the paging enhancement solution are described herein as being implemented for a MUSIM device having a single-Tx/single-Rx antenna, the embodiments are not so limited and can be implemented for MUSIM devices having other radio frequency resource configurations.

System 100 comprises a first telecommunications network A 102 and a second telecommunications network B 104. In an embodiment, network A 102 is a cloud-native O-RAN 5G SA cellular telecommunication network.

The system includes user equipment (UE) 110, which can comprise a 5G cellular mobile device, such as a smartphone or tablet, configured to connect to one or more networks via a wireless communication connection. In particular, UE 110 is a MUSIM device of the single-Rx/single-Tx type in which the multiple USIMs share the same radio frequency (RF) transceiver. As shown, UE 110 includes two USIMs, USIM A 115 and USIM B 118, however any plural number of USIMs can be used without departing from the scope of the embodiments. For purposes of this illustrative example, USIM A and USIM B are subscribed with respective mobile network operators (MNOs), referred to as carrier A and carrier B, that respectively operate network A 102 and network B 104. Although carrier A and B are shown and described as being different MNOs, it should be understood that the paging enhancement solutions disclosed herein apply to the cases where multiple USIMs are associated with the same MNOs and networks.

UE 110 can be in wireless communication with one or more RANs, namely, RAN A 120 and RAN B 170. A RAN is the component of a cellular telecommunications network that connects a UE to a data network (DN) via one or more core networks (CN). For example, as shown, RAN A 120 enables communication between UE 110 and CN A 130 associated with carrier A. Similarly, RAN B 170 enables communication between UE 110 and CN B 140, which is associated with carrier B.

In an exemplary embodiment further discussed herein, RAN A 120 can comprise a new-generation radio access network (NG-RAN) that uses the 5G new radio interface (NR). Furthermore, the wireless network 102 comprising RAN A 120 and associated CN A 130, is a 5G SA network. Embodiments of the disclosure may also be used with other types of current or future cellular networks, such as 3G, 4G, 6G, 7G, etc. 5G SA is a cellular infrastructure built specifically for 5G services by implementing 5G standards and protocols in the radio network and controller core, using 5G radios on the edge and a 5G core. Furthermore, in an embodiment, RAN A 120 can have an O-RAN architecture.

Network B 104 comprises RAN B 170 and associated CN B 130. RAN B enables wireless communication between UE 110 and CN B 140, which is associated with carrier B. Network B 104 can have a similar configuration as network A 102, or an alternative configuration. For example, network B 104 can be a 5G SA network with a non-open RAN configuration, a 5G non-standalone (5G NSA) network, 4G network, and the like.

As shown in FIG. 1, RAN A 120, having an O-RAN architecture, is disaggregated into three main building blocks: the radio unit (RU) 122, the distributed unit (DU) 124 and the centralized unit (CU) 126. The RU is located at the cellular telecommunications tower base station 118, where the radio frequency signals are transmitted to and received from UEs, amplified and digitized. The RU is located near, or integrated into, the antenna of the cellular telecommunications base station. The RU handles radio frequency (RF) and lower physical layer functions of the radio protocol stack, including beamforming. Although only one RU is shown, each cellular telecommunications base station can have multiple RUs to fully service a particular coverage area.

The DU 124 and CU 126 receive the digitalized radio signal from the RU 122, and send the digitalized radio signal into the CN 130. The DU is often physically located at or near the RU, whereas the CU can be located nearer the CN. The DU handles higher physical access layer, media access (MAC) layer and radio link control (RLC) functions. The CU performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the O-RAN standards promulgated by the O-RAN Alliance (website: https://www.o-ran.org/), as updated from time to time, and may be modified as desired to implement the various functions and features described herein.

A CN, such as CN A 130 and CN B 140, can provide access to one or more DNs, such as DN 180 and DN 185, which can comprise the Internet, a local area network (LAN), a wide area network (WAN), a private data network, a wireless network, a wired network, or a combination of networks. A CN has many functions. It provides access controls ensuring users are authenticated for the services they are using, it routes telephone calls over the PSTN, it enables operators to charge for calls and data use, and it connects users to the Internet. It also controls the respective network by making handovers happen as a user moves from coverage provided by one RAN base station to the next.

Figure 2:
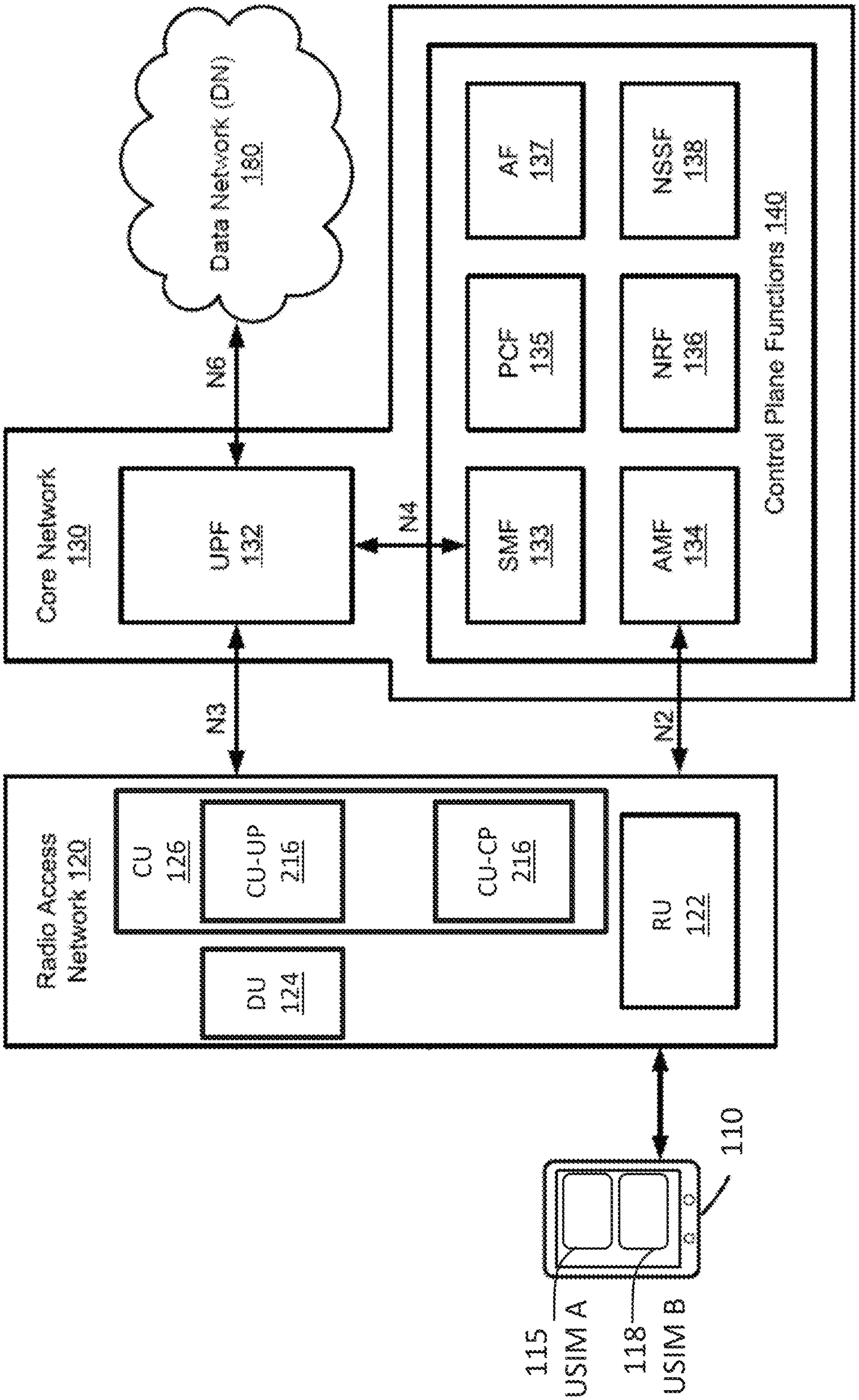
FIG. 2 is a diagram illustrating an exemplary architecture of a system in which a paging enhancement solution can be implemented according to an embodiment.

FIG. 2 depicts an exemplary implementation of the RAN A 120 and CN A 130 in greater detail. In a possible O-RAN implementation, CU 126 and the 5G CN A 130 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at the same server facility where the DU is executed, while other functions are executed at a separate server system. In the illustrated embodiment of network A 102, cloud-based cellular network components include the CU 126 and CN A 130. Such cloud-based cellular network components can be executed as specialized software executed by underlying general-purpose computer servers. Cloud-based cellular network components may be executed on a third-party cloud-based computing platform or a cloud-based computing platform operated by the same entity that operates the RAN A 120. A cloud-based computing platform may have the ability to devote additional hardware resources to cloud-based cellular network components or implement additional instances of such components when requested.

The CN A 130 can include a plurality of network elements that are configured to offer various data and telecommunications services to subscribers or end users of UEs, such as UE 110. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Various network functions, such as the core network functions and radio access network functions of network A 102, can be implemented using a cloud-based compute and storage infrastructure. A network function may be implemented as a software instance running on hardware or as a virtualized network function. The CN A 130, can utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and application programming interfaces (APIs). In some cases, control plane (CP) functions may interact with each other using the service-based architecture. Components of the RAN A 120, particularly functions of the DU 124 and CU 126 can similarly utilize a cloud-native service-based architecture.

The 5G SA network A 102 can comprise one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the 5G SA network A 102. In that USIM A 115 and USIM B 118 can in an embodiment be provided by the same MNO and use the same network infrastructure, logical instantiations of network A 102 and network B 104 can correspond to respective network slices. In some cases, the 5G network A 102 may support customized policy configuration and enforcement between network slices per service level agreements (SLAs) within the RAN 120. User equipment, such as UE 110, may connect to multiple network slices at the same time (e.g., eight different network slices).

The primary core network functions may comprise the access and mobility management function (AMF) 134, the session management function (SMF) 133, and the user plane function (UPF) 132 in FIG. 2. In the exemplary embodiment shown, the RAN A 120 is connected to the UPF 132 via interface N3. The UPF 132 is connected to the data network DN 180 via the N6 interface. Data is transported between the RAN A 120 and the CN 130 via the N3 interface. The UPF 132 can connect to the SMF 133 via the N4 interface.

The UPF 132 can be responsible for routing and forwarding user plane packets between the RAN A 120 and the DN 180. The UPF 132 can transfer downlink data received from the DN 180 to UEs, such as UE 110, via the RAN A 120 and/or transfer uplink data received from UEs to the data network 180 via the RAN A 120. An uplink may comprise a radio link though which a UE transmits data and/or control signals to the RAN A 120. A downlink may comprise a radio link through which the RAN A 120 transmits data and/or control signals to the UE. UPF 132 may perform packet processing including routing and forwarding, quality of service (QoS) handling, and packet data unit (PDU) session management. The UPF 132 may serve as an ingress and egress point for user plane traffic and provide anchored mobility support for UEs. For example, the UPF 132 may provide an anchor point between the UE 110 and the data network 180 as the UE moves between coverage areas.

The SMF 133 can perform session management, user plane selection, and IP address allocation. SMF 133 manages interactions on the data plane, creation and removal of protocol data unit sessions and managing session context with the UPF 132. SMF 133 manages UE context and network handovers between base stations, via the N2 interface. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). The SMF 133 may control the UPF 132 on a per end user data session basis, in which the SMF 133 may create, update, and remove session information in the UPF 132. The SMF 133 is responsible for the allocation and management of IP addresses that are assigned to the UE 110, as well as the selection of the UPF 132 for traffic associated with a particular PDU session for the UE 110.

UE 110 can connect to the AMF 134, which is responsible for authentication and authorization of access requests, as well as mobility management functions via the N1 interface (not shown). The AMF 134 receives all connection and session related information from one or more UEs, and handles connection and mobility management tasks. The AMF forwards all messages related to session management to the SMF 133. The AMF can act as a single-entry point for a UE connection and perform mobility management, registration management, and connection management between a DN and UE. The AMF may interface with the SMF to track user sessions. The AMF may interface with a network slice selection function (NSSF) to select network slice instances for user equipment, such as UE 110. When user equipment is leaving a first coverage area and entering a second coverage area, the AMF may be responsible for coordinating the handoff between the coverage areas whether the coverage areas are associated with the same radio access network or different radio access networks. The N2 interface may be used for transferring control plane signaling between the RAN A 120 and the AMF 134.

Other core network functions may include a network repository function (NRF) 136 for maintaining a list of available network functions and providing network function service registration and discovery, a policy control function (PCF) 135 for enforcing policy rules for control plane functions, an authentication server function (AUSF) (not shown) for authenticating user equipment and handling authentication related functionality, a NSSF 138 for selecting network slice instances, and an application function (AF) 137 for providing application services. Each of the network functions NRF 136, PCF 135, AF 137, NSSF 138, AMF 134, and SMF 133 may communicate with each other via a service-based interface (not shown) using APIs.

As shown in FIG. 2, the RAN A 120 can provide separation of the CU 126 functionalities into the centralized unit for the control plane CU-CP 214 and centralized unit for the user plane CU-UP 216 while supporting network slicing. The CU-CP 214 can obtain resource utilization and latency information from the DU 124 and/or the CU-UP 216, and select a CU-UP to pair with the DU 124 based on the resource utilization and latency information in order to configure a network slice. Network slice configuration information associated with the network slice may be provided to the UE 110 for purposes of initiating communication with the UPF 132 using the network slice.

Turning again to FIG. 1, and with continued reference to the exemplary implementation of network A 102 shown in FIG. 2, paging collisions is a problem that arises with MUSIM devices, such as UE 110, having multiple USIMs with respective subscriptions to services provided by one or more MNOs. Paging is a mechanism used by a network to notify idle user equipment about incoming data, call requests, network updates and the like. For example, in the 5G SA network A 102, the AMF 134, sends a paging message through the wireless base station 118 containing key information elements that enable the UE 110 using USIM A 115 to receive the paging message and respond accordingly. UE 110 is configured to listen for paging messages from the network during a specific interval within the paging channel referred to as the paging occasion (PO). More specifically, user paging can be performed in specific radio frames as part of sub-frames. The radio frame in which a paging message can be transmitted is referred to as paging frames and the respective sub-frames are the POs.

In a 5G network, the PO is determined at the time of camping and is defined by, among other parameters, the 5G-GUTI (globally unique temporary UE Identity) which is assigned for a given USIM by the wireless network during registration. In response to a paging message, the UE initiates a service request procedure to establish a connection with the network. Paging functions mostly for triggering RRC setup. A UE is usually paged, per specifications, when they are in the RRC-Idle state, for example, to wake the UE and prompt it to be ready for connection.

A Multi-USIM UE with single-Rx configuration cannot simultaneously monitor paging on more than one network. If the POs for two USIMs overlap in time, paging reception collision occurs. For example, UE 110 can be camped and registered with wireless network A 102 and network B 104 at the same time. In that UE 110 is a single-Tx/single-Rx device, UE 110 can select one of the networks to monitor when the UE is in RRC_Idle state or RRC_Inactive state in both networks. UE 110 can be configured to tune back and forth between the two networks to receive the paging messages from both networks using its single transceiver. However, when the paging occasions for network A 102 and network B 104 are the same, the paging messages for the two networks will overlap. As a result, the UE will not receive a paging message from one network if it is listening for paging messages from the other network. The result of missing paging occasions and paging collisions includes a negative impact on the user experience. Paging collisions can also occur when there is partial overlap of the timing of paging occasions for two networks. Although collisions might not always occur since paging messages can be received in non-overlapping portions of the paging occasions, service and experience can still be degraded.

Figure 3:
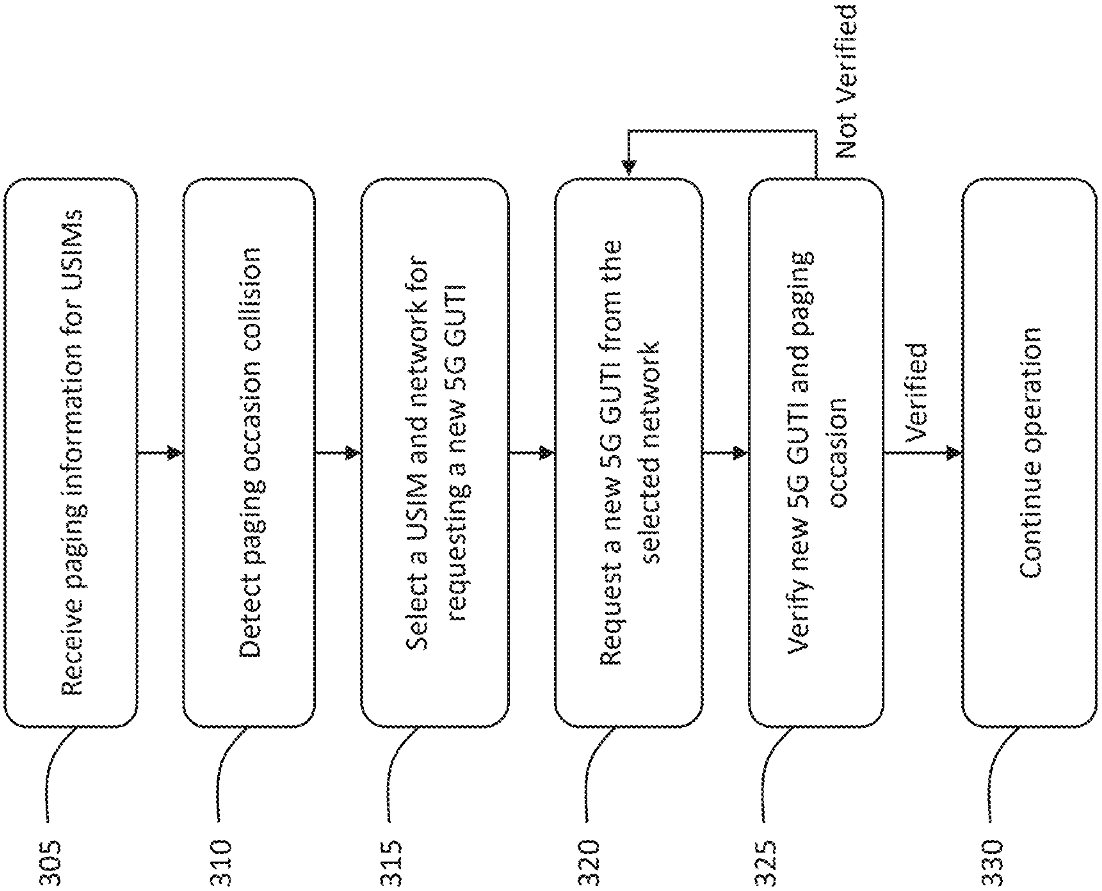
FIG. 3 is a process flow diagram illustrating an exemplary paging enhancement method according to an embodiment.

Aspects of the present disclosure comprise solutions to mitigate the problem of paging collisions for MUSIM devices having a single-Tx/single-Rx configuration in a network environment comprising a 5G SA O-RAN network. FIG. 3 is an exemplary method 300 for paging enhancement for a single-Rx/single-Tx MUSIM UE in a wireless communications network environment comprising a 5G SA O-RAN network according to an embodiment. For example, the method 300 is shown and described as being implemented in the exemplary system 100.

At step 305 the UE 110 registers to network A 115 and network B using USIM A 115 and USIM B 118, respectively. As a result, UE 110 receives paging information from each of network A 102 and network B 104. More specifically, during registration with a given network, a 5G-GUTI is assigned for the corresponding USIM and returned in a Registration Accept message to UE 110. It should be noted that 3GPP specifications provide that all USIM registrations of a device are treated as independent UEs from the network perspective, despite being in the same device (e.g., UE 110). The PO for a USIM on the given network is defined as a function of the assigned 5G-GUTI. Accordingly, during registration with networks A and B, respective 5G-GUTIs are assigned and provided to the UE 110 and the respective POs for USIM A 115 and USIM B 118 can be determined therefrom.

At step 310, UE 110 determines whether a paging collision occurs between the registrations with network A 102 and network B 104. For example, the UE 110, which is configured by executing the paging enhancement module, can compare the respective POs for USIM A and USIM B to determine whether there is any overlap between the respective time frames of the POs.

It should be understood that steps 305 and 310 are non-limiting examples of how UE 110 can detect that a paging collision has occurred or could occur. As a further example, UE 110 can determine that a paging collision has occurred based on paging messages received from network A 102 and network B 104.

At step 315, in response to detecting a paging collision at step 310, the UE 110 can select a USIM for which to trigger the allocation of a new unique temporary user equipment identity (e.g., a new 5G-GUTI in 5G systems) that defines a new paging occasion. More specifically, the paging enhancement module can configure the UE 110 to select one of the USIMs from among the multiple USIMs according to prescribed network preference rules.

In an embodiment, the one of multiple USIMs can be identified in the network preference rules as the primary USIM for which to request a new 5G-GUTI as a priority. Accordingly, to simplify and avoid complexity in case of a paging collision, the paging enhancement module can configure the UE 110 to utilize the primary USIM to request a new 5G-GUTI from the corresponding network.

Furthermore, in an embodiment, the network preference rules can identify a USIM subscribed with a network that is preferred for requesting a new 5G-GUTI, such as a 5G SA O-RAN network. Accordingly, the paging enhancement module can configure the UE 110 to prioritize requesting the new 5G-GUTI from a preferred network over another network. For instance, in the example 5G SA O-RAN deployment of network A 102, the 5G core network 130 elements can be deployed in the cloud close to the CU element of RAN A 120, namely, CU-UP 216 and CU-CP 214, the paging procedure from the CN to the RAN domain is comparatively faster than in an LTE and 5G non-standalone (NSA) type of network where multiple network elements are involved. Accordingly, the paging enhancement module can preferably configure the UE 110 to prioritize requesting a new 5G-GUTI for USIM A 115 from network A 102 over another network.

At step 320, the UE 110 can request a new 5G-GUTI from the network that corresponds to the USIM selected at step 315. For example, UE 110 using USIM A 115 can send a request to network A 102 for allocation of a new 5G-GUTI for USIM A 115. More specifically, UE 110, which is configured by executing the paging enhancement module, initiates with the network A 102, and more particularly the AMF 134, a mobility registration update (MRU) without any specific indication. As part of the 5G registration process, MRU is a mechanism used by the UE to force a registration update. It can be used in scenarios such as when a device moves out of range or when it gets low on battery power and, here, during a paging modification process. The MRU message is a periodic message that allows the UE to update its serving cell and mobility information. In response to the MRU request, the AMF 134 assigns and returns a new 5G-GUTI for USIM A 115 a registration accept message sent back to the UE. As a result of the new 5G-GUTI, a new paging occasion for USIM A is defined.

At step 325, to add more robustness before allocating the new device identifier to a USIM, UE 110 can verify that the new identifier and corresponding PO will also not result in a paging collision. For example, the UE 110, which is configured by executing the paging enhancement module, can compare the new 5G GUTI for USIM A 115 to the previously defined 5G GUTI for USIM A to determine that they are different and thus will not result in a paging collision with the existing PO for USIM B 118.

In that the POs for USIMs A 115 and B 118 do not overlap as a result of step 325, at step 330, UE 110 proceeds to operate using USIMs A and B and receive paging separately from networks A 102 and B 104 without paging collisions. For example, in an embodiment, in the event that paging is received from both networks A and B, the UE 110 can be configured to choose which carrier to latch on to and process for call connection.

The exemplary implementations of paging enhancement in the UE 110 configured to operate in the 5G SA O-RAN network A 102 yields significant technical benefits. More specifically, cloud deployment of the 5G CN A 130 and RAN A 120, particularly situating the AMF 134 network element which handles paging and MRU via RAN A 120 close to the CU element of RAN A 120, provides for faster timing for both updating a 5G-GUTI to avoid paging collisions, as well as switching to or from the network A through multi USIMs. By comparison, in typical LTE and 5G NSA deployments that are mostly not cloud native O-RAN deployments, the physical EPC (MME specifically in LTE) can result in greater delays due to signaling procedures.

Furthermore, disclosed embodiments for paging enhancement in MUSIM devices in a 5G SA O-RAN network achieves numerous advantages that improve the user experience. In particular, the paging enhancement solution of the present disclosure avoids paging collisions and, as a result, helps to maintain a multi-USIM connection.

For instance, consider the example scenario in which the UE 110 is in the RRC connected state with network A 102 and active using a USIM A 115, the USIM B 118 connection to network B 104 is in the RRC idle, and there is a need for UE 110 to connect to network B 104 using USIM B 118 (e.g., to perform an activity update). Without implementing the paging collision detection and mitigation solutions of the present disclosure, a PO collision would prevent UE 110 from receiving the paging message and switching to connect to network B 104. The UE 110 would remain attached to network A 102 using USIM A 115 and would not attempt to connect to network B 104 using USIM B 118. However, by implementing the paging collision detection and mitigation solutions of the present disclosure, the paging collision is avoided or resolved and the UE 110 thus has the unimpeded ability to receive paging messages and attach using any of the multiple USIMs.

Additionally, the paging enhancement solution of the present disclosure provides flexibility for users to use multiple USIMs based on the user's need and priority and enables easier switching among USIMs, for example, for purposes of tariff hopping. The need or desire to switch among multiple USIMs can happen for various user and/or device driven reasons. For example, a first USIM can be preferable for voice service while a second USIM can be preferable for data or live streaming services. Additionally, the paging enhancement solution of the present disclosure enables MUSIM users to switch between different mobile network services manually.

Moreover, enhanced switching among USIMs for a MUSIM device can be well achieved through network slicing with a cloud-implemented 5G SA O-RAN network, such as network A 120, particularly through slicing of multiple USIMs that are from the same carrier. More specifically, as noted above, network slicing is a salient feature of 5G SA and O-RAN deployments. In general, a network slice is a network subset of the whole network consisting of all network elements. Slicing enables dedicated slices to be utilized for specific respective purposes, such as, providing the logical instantiations of network A 102 and network B 104 for USIM A 115 and USIM B 118. As a result, these separate and individually operating network slices can be utilized for respective tariff, billing and technical aspects. Leveraging 5G SA, SBA and O-RAN deployment with slicing further helps to mitigate paging collisions in this scenario.

Figure 4:
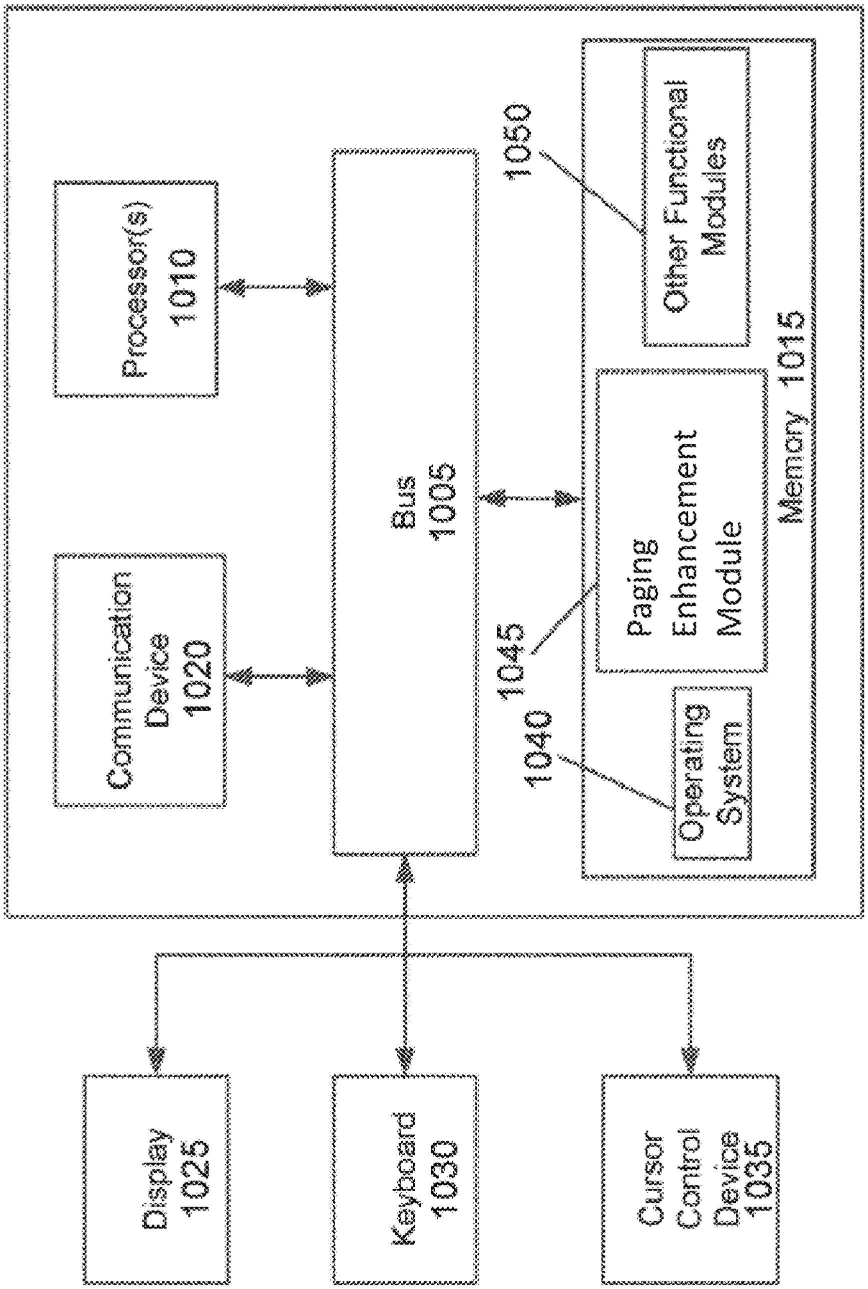
FIG. 4 is a system diagram illustrating an exemplary configuration of a computing system(s) for implementing embodiments described herein.

FIG. 4 is an architectural diagram illustrating a computing system 1000 configured to perform respective functionality for paging enhancement for single-Rx/single-Tx MUSIM devices in a standalone network having an O-RAN environment, according to an embodiment of the present disclosure. In some embodiments, computing system 1000 may be one or more of the computing systems depicted and/or described herein, such as UE 110, a carrier server, etc. Computing system 1000 includes a bus 1005 or other communication mechanism for communicating information, and processor(s) 1010 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments. In certain embodiments, at least one of processor(s) 1010 may be a neuromorphic circuit that includes processing elements that mimic biological neurons. In some embodiments, neuromorphic circuits may not require the typical components of a Von Neumann computing architecture.

Computing system 1000 further includes a memory 1015 for storing information and instructions to be executed by processor(s) 1010. Memory 1015 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both.

Additionally, computing system 1000 includes a communication device 1020, such as a transceiver, to provide access to a communications network via a wireless and/or wired connection. In some embodiments, communication device 1020 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the disclosed embodiments. In some embodiments, communication device 1020 may include one or more antennas that are singular, arrayed, phased, switched, beamforming, beamsteering, a combination thereof, and or any other antenna configuration without deviating from the scope of the disclosure.

Processor(s) 1010 are further coupled via bus 1005 to a display 1025, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the disclosure.

A keyboard 1030 and a cursor control device 1035, such as a computer mouse, a touchpad, etc., are further coupled to bus 1005 to enable a user to interface with computing system 1000. However, in certain embodiments, a physical keyboard and mouse may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1040 for computing system 1000. The modules further include a paging enhancement module 1045 that is configured to perform all or part of the processes described herein or derivatives thereof including the procedures for mitigating paging collisions. Computing system 1000 may include one or more additional functional modules 1050 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the disclosure. Presenting the above-described functions as being performed by a "system" is not intended to limit the scope of the present disclosure in any way, but is intended to provide one example of the many embodiments of the present disclosure. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the disclosure.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the disclosure.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps described herein, including those described as being performed in connection with FIG. 3, may be performed by computer program(s), encoding instructions for the processor(s) to perform at least part of the described process(es), in accordance with embodiments of the present disclosure. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1010 of computing system 1000 of FIG. 4) to implement all or part of the process steps, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

The terms "a," "an," and "the," as used in this disclosure, means "one or more," unless expressly specified otherwise.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a RF communication link, an Infrared (IR)

communication link, or an optical communication link. The RF communication link can include, for example, Wi-Fi, WiMAX, IEEE 802.11, DECT, 0G, 1G, 2G, 3G, 4G or 5G cellular standards, or Bluetooth.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the RF or IR spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the exemplary embodiments and applications illustrated and described, and without departing from the true spirit and scope encompassed by the present disclosure.

What is claimed is:

1. A method for performing paging enhancement, the method comprising:

detecting, with a mobile device having multiple universal subscriber identity modules (USIMs) including a first USIM subscribed with a first cellular telecommunications network and a second USIM subscribed with a second cellular telecommunications network, a paging collision by comparing a first paging occasion (PO) for the first USIM with a second PO for the second USIM, wherein the first PO is defined by a temporary user equipment identity assigned to the first USIM and the second PO is defined by a temporary user equipment identity assigned to the second USIM;

selecting, in response to detecting the paging collision, a selected USIM from the first USIM and the second USIM for which to request a new temporary user equipment identity, wherein the one of the first USIM and the second USIM is selected according to a network preference rule;

requesting the new temporary user equipment identity from one of the first cellular telecommunications network and the second cellular telecommunications network that the selected one of the first USIM and the second USIM is subscribed with; and continuing communications with the one of the first cellular telecommunications network and the second cellular telecommunications network that corresponds to the selected USIM using a new PO defined by the new temporary user equipment identity for the selected one of the first USIM and the second USIM;

wherein the network preference rule specifies that one of the first USIM and the second USIM is a primary USIM for which to request the new temporary user equipment identity.

2. The method of claim 1, further comprising: verifying that the new temporary user equipment identity does not cause a new paging collision with a PO of another USIM of the mobile device.

3. The method of claim 2, wherein the verifying includes: comparing the new temporary user equipment identity with a previously assigned temporary user equipment identity to determine they are different.

4. The method of claim 2, wherein the verifying includes repeating the detecting a paging collision based on the new PO determined from the new temporary user equipment identity.

5. The method of claim 1, wherein the mobile device is a 5G mobile device having a single transmit antenna and a single receive antenna, wherein each temporary user equipment identity comprises a 5G globally unique temporary user equipment identity (5G GUTI), and wherein at least one of the first cellular telecommunications network and the second cellular telecommunications network is a cloud-native fifth-generation standalone open-radio access network (5G SA O-RAN).

6. The method of claim 5, and wherein the network preference rule prioritizes requesting the 5G GUTI for one of the first USIM and the second USIM that is subscribed with the 5G SA O-RAN.

7. A non-transitory computer-readable medium storing a computer program configured to cause a processor of a mobile device, which has multiple universal subscriber identity modules (USIMs) for communicating with at least one cellular telecommunications network, to:

detect a paging collision by comparing a first paging occasion (PO) for a first USIM of the mobile device subscribed with a first cellular telecommunications network with a second PO for a second USIM of the mobile device subscribed with a second cellular telecommunications network, wherein the first PO is defined by a temporary user equipment identity assigned to the first USIM and the second PO is defined by a temporary user equipment identity assigned to the second USIM;

select, in response to detecting the paging collision, a selected USIM from the first USIM and the second USIM for which to request a new temporary user equipment identity, wherein the one of the first USIM and the second USIM is selected according to a network preference rule;

request the new temporary user equipment identity from one of the first cellular telecommunications network and the second cellular telecommunications network that the selected one of the first USIM and the second USIM is subscribed with; and continue communications with the one of the first cellular telecommunications network and the second cellular telecommunications network that corresponds to the selected USIM using a new PO defined by the new temporary user equipment identity for the selected one of the first USIM and the second USIM;

wherein the network preference rule specifies that one of the first USIM and the second USIM is a primary USIM for which to request the new temporary user equipment identity.

8. The non-transitory computer-readable medium of claim 7, wherein the computer program is configured to cause the processor to: perform a verification that the new temporary user equipment identity does not cause a new paging collision with a PO of another USIM of the mobile device.

9. The non-transitory computer-readable medium of claim 8, wherein the verification includes:

comparing the new temporary user equipment identity with a previously assigned temporary user equipment identity to confirm they are different.

10. The non-transitory computer-readable medium of claim 8, wherein the verification includes:

repeating the detecting a paging collision based on the new PO determined from the new temporary user equipment identity.

11. The non-transitory computer-readable medium of claim 7, wherein the mobile device is a 5G mobile device having a single transmit antenna and a single receive antenna, wherein each temporary user equipment identity comprises a 5G globally unique temporary user equipment identity (5G GUTI), and wherein at least one of the first cellular telecommunications network and the second cellular telecommunications network is a cloud-native fifth-generation standalone open-radio access network (5G SA O-RAN).

12. The non-transitory computer-readable medium of claim 11, wherein the network preference rule prioritizes requesting the 5G GUTI for one of the first USIM and the second USIM that is subscribed with the 5G SA O-RAN cellular telecommunications network.

13. A system for performing paging enhancement, the system comprising:

a mobile device having a first universal subscriber identity module (USIM) subscribed with a first cellular telecommunications network, a second USIM subscribed with a second cellular communications network, a processor, and a non-transitory computer-readable medium storing a computer program, wherein the computer program configures the processor to:

detect a paging collision by comparing a first paging occasion (PO) for the first USIM with a second PO for the second USIM, wherein the first PO is defined by a temporary user equipment identity assigned to the first USIM and the second PO is defined by a temporary user equipment identity assigned to the second USIM, select, in response to detecting the paging collision, a selected USIM from the first USIM and the second USIM for which to request a new temporary user equipment identity, wherein the one of the first USIM and the second USIM is selected according to a network preference rule, request a new temporary user equipment identity from one of the first cellular telecommunications network and the second cellular telecommunications network that the selected one of the first USIM and the second USIM is subscribed with, and continue communications with the one of the first cellular telecommunications network and the second cellular telecommunications network that corresponds to the selected USIM using a new paging occasion defined by the new temporary user equipment identity for the selected one of the first USIM and the second USIM;

wherein the network preference rule specifies that one of the first USIM and the second USIM is a primary USIM for which to request the new temporary user equipment identity.

14. The system of claim 13, wherein the processor is configured to: verify that the new temporary user equipment identity does not cause a new paging collision with a paging occasion of another USIM of the mobile device.

15. The system of claim 14, wherein the processor verifies that the new temporary user equipment identity does not cause a new paging collision by comparing the new temporary user equipment identity with a previously assigned temporary user equipment identity to confirm that they are different.

16. The system of claim 13, wherein the mobile device is a 5G mobile device having a single transmit antenna and a single receive antenna, wherein each temporary user equipment identity comprises a 5G globally unique temporary user equipment identity (5G GUTI), and wherein at least one of the first cellular telecommunications network and the second cellular telecommunications network is a cloud-native fifth-generation standalone open-radio access network (5G SA O-RAN).

17. The system of claim 16, wherein the network preference rule configures the processor to prioritize requesting the 5G GUTI for one of the first USIM and the second USIM that is subscribed with the 5G SA O-RAN cellular telecommunications network.

* * * * *